Figure 1:
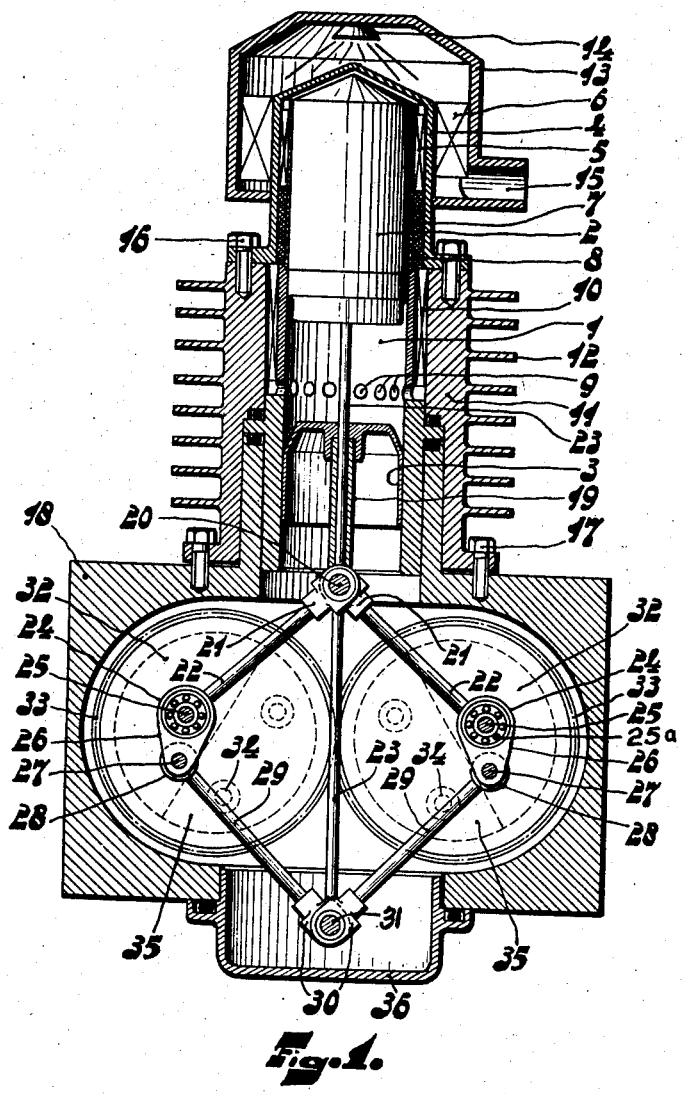

May 12, 1959 R. J. MEYER 2,885,855
HOT-GAS RECIPROCATING MACHINE OF THE DISPLACER-PISTON TYPE
Filed Nov. 2, 1954 2 Sheets-Sheet 1

INVENTOR
ROELF JAN MEYER
BY
AGENT

May 12, 1959

R. J. MEYER 2,885,855

HOT-GAS RECIPROCATING MACHINE OF THE DISPLACER-PISTON TYPE

Filed Nov. 2, 1954

2 Sheets—Sheet 2

INVENTOR
ROELF JAN MEYER

BY

AGENT

United States Patent Office 2,885,855
Patented May 12, 1959

2,885,855
HOT-GAS RECIPROCATING MACHINE OF THE DISPLACER-PISTON TYPE

Roelf Jan Meyer, Eindhoven, Netherlands, assignor, by mesne assignments, to North American Philips Company, Inc., New York, N.Y., a corporation of Delaware Application November 2, 1954, Serial No. 466,403

Claims priority, application Netherlands November 6, 1953

7 Claims. (Cl. 60—24)

The invention relates to a hot-gas reciprocating machine of the displacer type and is characterized in that the movement of the piston is transmitted by two equal connecting rods lying symmetrically one on each side of the center line of the machine to two equal cranks forming part of two crank shafts, rotating in synchronism, in phase and in opposite directions and provided with counterpoise, the center lines of these shafts which are parallel to one another, lie symmetrically one on each side of the center line of the machine in a plane at right angles to the center line of the machine, the displacer having secured to it a rod which is coupled by two displacer connecting rods also lying symmetrical relative to the center line of the machine with the cranks. The term "hot-gas reciprocating machine" is to be understood to mean a hot-gas motor, a cold-gas refrigerator or a heat pump, the latter two operating on the so-called reversed hot-gas engine principle.

A machine comprising the driving system according to the invention has the advantage that it can be satisfactorily balanced. Moreover, the required phase difference between the displacer movement and the piston movement is obtained in a simple manner.

In a preferred embodiment of the invention the piston connecting rods are located on one side of a plane through the center lines of the cranks, whereas the displacer connecting rods lie on the other side of this plane. Thus the construction of the machine as a whole and of the heads of the connecting rods in particular is simplified.

Balancing of the rocking parts of the machine is further improved, if according to a further aspect of the invention the piston connecting rods have approximately the same length as the displacer connecting rods and the masses of the piston connecting rods with the rocking members secured thereto are substantially equal to those of the displacer connecting rods with the rocking members secured thereto. The harmonics of higher order are substantially compensated in this form of the driving system, while the oscillations of the first order are compensated by the presence of the counterpoise.

In a preferred embodiment of the invention the piston connecting rods are secured so as to be rotatable on the piston side directly to one another and to a piston rod secured rigidly to the piston. In principle, use may be made of a so-called trunk piston, to which the connecting rods are secured without the use of a piston rod. However, the connection between the piston connecting rods and the piston is in this case less simple from a structural point of view. If use is made of a piston rod secured rigidly to the piston, the coupling of the piston connecting rods with the piston rod is much simpler. Moreover, a closed space may then be provided below the piston, so that the crank case need not be subjected to pressure.

It is obvious that with the machine according to the invention a constant phase difference, determined by the various dimensions of the driving system, prevails between the displacer movement and the piston movement. If it is desired to vary this phase difference, for example for control purposes, the ends of the displacer connecting rods remote from the cranks may be connected, in a preferred embodiment of the invention, to the displacer rod in a manner such that the space between each end can be adjusted by means of the displacer connecting rod, the two displacer connecting rods remaining, however, symmetrical relative to the displacer.

The rotation of the shafts in synchronism, in phase and in opposite directions may be realized in various ways. In accordance with a further aspect of the invention the simplest may is to connect the shafts to one another by means of gear wheels.

According to one aspect of the invention the mechanical energy is supplied to and withdrawn from the machine by means of the two shafts.

The invention will be described with reference to the accompanying drawing, which shows one embodiment and in which Fig. 1 is a sectional view of a hot-gas reciprocating engine of the displacer type.

Figs. 2a, 2b, 2c and 2d show diagrammatically the relative positions of the piston and the displacer with the driving system for four different crank positions.

Referring to the drawing, reference numeral 1 designates a cylinder of a hot-gas reciprocating engine, in which a displacer 2 and a piston 3 are adapted to move. The top end of the cylinder is constituted by a cylinder head 4, having vanes 5 on the inner side and vanes 6 on the outer side. A lining 7 constitutes a separation between the vanes 5 and a regenerator 8 from the interior of the cylinder. The cylinder has, moreover, apertures 9 communicating with a space, provided with vanes 10, secured to a body 11 having ridges 12 on the outer side, these vanes and ridges constituting the cooling system. The cylinder head is surrounded by a body 13, in which a burner 14 (shown diagrammatically) is provided. The combustion gases brush past the vanes 6 and leave the body 13 after having given up the heat through the outlet duct 15. The cylinder head 4 is secured by bolts 16 to the body 11, which body is secured by bolts 17 to a crank case 18. These bolts secure, moreover, the cylinder 1 to the crank case 18. The piston 3 is provided with a hollow piston rod 19. About a shaft 20, which is rigidly secured to the piston rod 19, are adapted to rotate two heads 21 of two connecting rods 22, while a displacer rod 23, secured rigidly to the displacer, is taken through the piston rod 19 and the shaft 20. The connecting rods 22 have two heads 24, which are rotatable about crank shafts 25. Between the heads 24 and the crank shafts 25 provision is made for ball bearings 25a. The heads 24 have extensions 26, having shafts 27, about which two displacer connecting rod heads 28 are adapted to rotate. On the other side of the displacer connecting rods 29 provision is made for heads 30, which are both rotatable about a shaft 31, which is secured rigidly to the displacer rod 23. The crank shafts 25 are arranged eccentrically on shafts 32, which are connected to one another by gear wheels 33 and to which counter-poises 35 are secured by screws 34. The crank case 18 is closed by a lid 36, so that the complete crank case may, if desired, be filled with oil.

The masses of the piston connecting rods 22, the piston rod 19 and the piston 3 are approximately equal to the masses of the displacer connecting rods 29, the displacer rod 23 and the displacer 2, while the length of each piston connecting rod 22 is approximately equal to that of the displacer connecting rods 29.

It is evident that the phase difference between the displacer movement and the piston movement is determined by the angle between the piston connecting rod 22 and the displacer connecting rod 29. If the displacer connecting rod heads 30 are not caused to rotate about the shaft 31 and if this shaft is replaced for example by a member secured at right angles to the displacer rod 23, this member having displaceable shafts, about which the displacer connecting rod heads 30 are adapted to rotate and if provisions are made that the distance between each shaft and the centre line of the machine is constant, the said phase difference may be varied, as will be explained further hereinafter.

Figure 2:
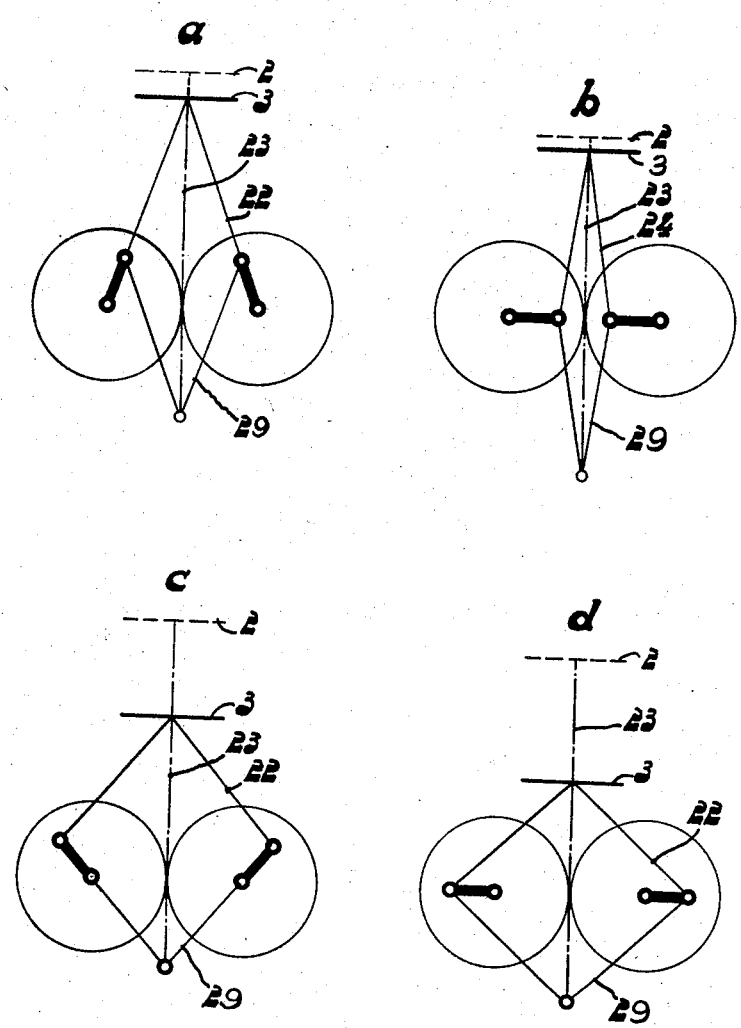

Figs. 2 a, b, c and d show diagrammatically the various positions of the piston and the displacer relative to one another for four different crank positions. The displacers 2 with the displacer rods 23 are indicated by broken lines, the pistons 3 by full lines. The piston connecting rods 22 have the same length as the displacer connecting rods 29 and are secured directly to the pistons as shown in the figures. As shown in Fig. 2a the piston occupies its top position; Fig. 2b shows the position in which the piston and the displacer are closest to one another, so that the cold space is at a minimum; Fig. 2c shows the top position of the displacer and Fig. 2d shows a maximum distance between the displacer and the piston, so that in this case the cold space is at a maximum.

The phase difference between the piston movement and the displacer movement may be seen from Figs. 2a and 2c; the angle between the crank position of Fig. 2a and the crank position of Fig. 2c designates this phase difference.

From the figures it is also evident that, if at the end of the displacer rod for example a transverse rod is secured at right angles to this displacer rod and if the displacer connecting rods lie symmetrical one on each side of the displacer rod and are secured so as to be rotatable to this transverse rod, the phase difference is varied; it decreases according as the distance between the displacer connecting rod head and the displacer rod increases. If this distance is continuously variable, a power control of the engine may be obtained.

As is evident from the drawing, the shafts 32 rotate in phase, in synchronism and in opposite directions of rotation, whilst the plane through the center lines of these shafts intersects the center line of the machine at right angles. Moreover, the center lines of the shafts 32 are parallel to one another. If the counterpoise 35 has the correct weight, a substantially complete balancing of the machine may be obtained, so that the machine is free from vibrations.

The mechanical energy may be withdrawn from the machine advantageously by way of the two shafts, so that the load of the two shafts and that of the parts co-operating herewith are equal. If the machine is used as a refrigerator, the mechanical energy will be supplied preferably also by way of the two shafts.

Of course, a plurality of the machines described above may be arranged behind one another, so that a multi-cylinder machine is obtained, the assembly being completely free from vibrations, since each unit is substantially completely balanced.

What is claimed is:

1. A hot-gas reciprocating machine comprising a cylinder, a displacer within said cylinder, a piston within said cylinder and provided with a bore extending axially of the cylinder, and means connecting said piston and displacer in an out-of-phase relationship, said means comprising two members rotatably mounted on axes located one on each side of the axis of the cylinder, a pivot located eccentrically on each of said members, two piston connecting rods of equal length each having one end pivotally connected to said piston, two elongated crank members each rotatably mounted on one of said pivots, the free end of each of said piston connecting rods being pivotally secured to each adjacent crank member, a displacer rod having one end secured to said displacer and extending through the bore of said piston, two displacer connecting rods of equal length each having one end rotatably secured to the free end of said displacer rod and means pivotally securing the other end of each of said displacer connecting rods to one of said crank members at a point spaced from the adjacent pivot each of said piston connecting rods having substantially the same length as each displacer connecting rod, and the masses of the piston and its associated moving parts are substantially equal to the masses of the displacer and its associated moving parts whereby balancing of the moving parts of the engine is accomplished.

2. A hot-gas reciprocating machine of the displacer type as set forth in claim 1 wherein each piston connecting rod and adjacent displacer connecting rod are located on opposite sides of the longitudinal axis of said displacer rod.

3. A hot-gas reciprocating machine comprising a cylinder, a displacer within said cylinder, a piston within said cylinder and provided with a bore extending axially of the cylinder, and means connecting said piston and displacer in an out-of-phase relationship, said means comprising two members rotatably mounted on axes located one on each side of the axis of the cylinder, a pivot located eccentrically on each of said members, two piston connecting rods of equal length each having one end pivotally connected to said piston, two elongated crank members each rotatably mounted on one of said pivots, the free end of each of said piston connecting rods being pivotally secured to each adjacent crank member, means rotatably connecting said piston connecting rods to one another and to said piston, a displacer rod having one end secured to said displacer and extending through the bore of said piston, two displacer connecting rods of equal length each having one end rotatably secured to the free end of said displacer rod, and means pivotally securing the other end of each of said displacer connecting rods to one of said crank members at a point spaced from said one pivot, each of said piston connecting rods having substantially the same length as each displacer connecting rod, and the masses of the piston and its associated moving parts are substantially equal to the masses of the displacer and its associated moving parts whereby balancing of the moving parts of the engine is accomplished.

4. A hot-gas reciprocating engine comprising a cylinder, a displacer within said cylinder, a piston within said cylinder and provided with a bore extending axially of the cylinder, and means connecting said piston and displacer in an out-of-phase relationship, said means comprising two members rotatably mounted on axes located one on each side of the axis of the cylinder, a pair of gear wheels operatively connected to said members and meshing with one another, a pivot located eccentrically on each of said members, two piston connecting rods of equal length each having one end pivotally connected to said piston, two elongated crank members each rotatably mounted on one of said pivots, the free end of each of said piston connecting rods being pivotally secured to each adjacent crank member, a displacer rod having one end secured to said displacer and extending through the bore of said piston, two displacer connecting rods of equal length each having one end rotatably secured to the free end of said displacer rod, and means pivotally securing the other end of each of said displacer connecting rods to one of said crank members at a point spaced from said one pivot, each of said piston connecting rods having substantially the same length as each displacer connecting rod, and the masses of the piston and its associated moving parts are substantially equal to the masses of the displacer and its associated moving parts whereby balancing of the moving parts of the engine is accomplished.

5. A hot-gas reciprocating apparatus comprising a cylinder, a displacer within said cylinder, a piston within said cylinder and provided with a bore extending axially of the cylinder, and means connecting said piston and displacer in an out-of-phase relationship, said means being provided with cranks and being pivotally connected and rotatable in opposite directions, said means comprising two piston connecting rods and two connecting displacer rods substantially of the same length, one of said piston connecting rods and an adjacent displacer rod being located at one side of the central axis of the cylinder whereas the other piston connecting rod and the other displacer connecting rod is located at the other side of the central axis of the cylinder, the pair of piston connecing rods being located at one side of the plane through said cranks and extending angularly with respect to the central axis of the cylinder, and the pair of displacer connecting rods being located substantially at the opposite side of said plane through said cranks.

6. A hot-gas reciprocating apparatus as claimed in claim 5 wherein in any position of the piston and displacer and in the geometric configuration formed by the assembly of piston connecting rods and displacer connecting rods, any one of the piston connecting rods is parallel to an opposite displacer connecting rod.

7. A hot-gas reciprocating apparatus comprising a cylinder, a displacer within said cylinder, a piston within said cylinder and provided with a bore extending axially of the cylinder, and means connecting said piston and displacer in an out-of-phase relationship, said means being provided with cranks and being pivotally connected and rotatable in opposite directions, said means comprising two piston connecting rods and two displacer connecting rods substantially of the same length, one of said piston connecting rods and one of said displacer connecting rods being located on one side of the central axis of the cylinder while the other piston connecting rod and displacer connecting rod is located at the other side of said central axis, the geometric configuration formed by the pairs of piston connecting rods and displacer connecting rods being a parallelogram with the sides thereof of substantially equal length.

References Cited in the file of this patent
UNITED STATES PATENTS

| | | |
|---|---|---|
| 668,626 | Cronwall | Feb. 26, 1901 |
| 1,073,065 | Anderson et al. | Sept. 9, 1913 |
| 1,240,862 | Lundgaard | Sept. 25, 1917 |
| 1,701,439 | Canfield | Feb. 5, 1925 |
| 2,083,808 | Andrews | June 15, 1937 |
| 2,432,725 | Connelly | Dec. 16, 1947 |
| 2,590,662 | Van Weenen | Mar. 25, 1952 |
| 2,596,051 | Stigter | May 6, 1952 |